(12) United States Patent
Daikeler et al.

(10) Patent No.: US 11,407,300 B2
(45) Date of Patent: Aug. 9, 2022

(54) HYBRID MODULE WITH SEPARATING CLUTCH AND ACTUATING DEVICE

(71) Applicant: Schaeffler Technologies AG & Co. KG, Herzogenaurach (DE)

(72) Inventors: René Daikeler, Sasbach (DE); Stephan Maienschein, Baden-Baden (DE); Christian Hügel, Rheinau (DE); Florian Vogel, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/266,647

(22) PCT Filed: Aug. 27, 2019

(86) PCT No.: PCT/DE2019/100775
§ 371 (c)(1),
(2) Date: Feb. 8, 2021

(87) PCT Pub. No.: WO2020/043240
PCT Pub. Date: Mar. 5, 2020

(65) Prior Publication Data
US 2021/0354547 A1    Nov. 18, 2021

(30) Foreign Application Priority Data

Aug. 27, 2018   (DE) .................... 102018120838.3
Aug. 2, 2019    (DE) .................... 10 2019 120 899.8

(51) Int. Cl.
*F16D 25/06*   (2006.01)
*B60K 6/387*   (2007.10)
*B60K 6/48*    (2007.10)

(52) U.S. Cl.
CPC ............ *B60K 6/387* (2013.01); *B60K 6/48* (2013.01); *B60K 2006/4825* (2013.01)

(58) Field of Classification Search
CPC .............................................. F16D 25/0635
See application file for complete search history.

(56) References Cited

U.S. PATENT DOCUMENTS 5,421,439 A * 6/1995 Hayasaki ............. F16D 48/02
                                                 192/85.25
5,542,517 A    8/1996 Peruski
(Continued)

FOREIGN PATENT DOCUMENTS

CN    104620008 A    5/2015
CN    105346372 A    2/2016
(Continued)

*Primary Examiner* — Ernesto A Suarez
*Assistant Examiner* — Lillian T Nguyen

(57) ABSTRACT

A hybrid module for a drivetrain of a motor vehicle includes a separating clutch for coupling an input-side drive shaft with an output-side intermediate shaft, and an actuating device for actuating the separating clutch, co-rotatable with the drive shaft or with the intermediate shaft. The actuating device includes a pressure chamber connectable to a pressure source arranged to provide a hydraulic actuating pressure through a hydraulic medium, and a compensation device for at least partially compensating a change in pressure in the pressure chamber from a first centrifugal force acting on the hydraulic medium. The drive shaft may be a crankshaft of an internal combustion engine arranged for mechanically driving the motor vehicle and the intermediate shaft may be a rotor shaft for an electric machine arranged for electrically driving the motor vehicle.

14 Claims, 10 Drawing Sheets

(56) References Cited

U.S. PATENT DOCUMENTS

| | | | | |
|---|---|---|---|---|
| 6,675,944 | B2 * | 1/2004 | Lee | F16D 25/12 |
| | | | | 192/85.25 |
| 8,322,504 | B2 * | 12/2012 | Mueller | F16D 25/0638 |
| | | | | 192/85.25 |
| 2003/0010593 | A1 | 1/2003 | Lee | |
| 2010/0326785 | A1 | 12/2010 | Schrage | |
| 2018/0313409 | A1 * | 11/2018 | Iizuka | F16D 25/0638 |
| 2021/0354547 | A1 | 11/2021 | Daikeler et al. | |

FOREIGN PATENT DOCUMENTS

| | | | |
|---|---|---|---|
| CN | 207128609 U | 3/2018 | |
| DE | 102006044218 | 4/2007 | |
| DE | 102009059944 | 7/2010 | |
| DE | 102015202869 A1 * | 9/2015 | F16D 25/0635 |
| DE | 102018120846 | 2/2020 | |
| DE | 102019112571 | 11/2020 | |
| DE | 102019123097 A1 | 2/2021 | |
| EP | 0098054 A1 * | 1/1984 | F16D 25/0635 |
| GB | 2446153 | 8/2008 | |
| KR | 20160019116 | 2/2016 | |

\* cited by examiner

HYBRID MODULE WITH SEPARATING CLUTCH AND ACTUATING DEVICE

CROSS-REFERENCE TO RELATED APPLICATIONS

This application is the United States National Phase of PCT Appln. No. PCT/DE2019/100775 filed Aug. 27, 2019, which claims priority to German Application Nos. DE102018120838.3 filed Aug. 27, 2018 and DE102019120899.8 filed Aug. 2, 2019, the entire disclosures of which are incorporated by reference herein.

TECHNICAL FIELD

The disclosure relates to a hybrid module for a drivetrain of a motor vehicle, such as a car, truck, bus, or other utility vehicle, with a separating clutch and an actuating device that actuates said separating clutch.

BACKGROUND

A hybrid module for a drivetrain of a vehicle is known from DE 10 2009 059 944 A1, wherein a wet multi-plate clutch of the hybrid module is arranged in the torque flow between a combustion engine and an electric motor arranged to be coaxial to the hybrid module. The multi-plate clutch can be hydraulically actuated by a non-rotatable actuating system mounted on a transmission input shaft.

Actuation of separating clutches in hybrid modules should be precise and prevent unnecessary loads. In designs without a damper, the alternating torques (up to 1600 Nm) must be transmitted via a clutch arrangement and/or the separating clutch with no slip or at least with little slip.

SUMMARY

The present disclosure indicates measures that enable a precise actuation of a separating clutch in a hybrid module and prevent unnecessary loads. In an example embodiment, the disclosure enables at least low-slip transmission of high alternating torques of up to 1600 Nm even without a torsional vibration damper provided in the hybrid module.

According to the disclosure, a hybrid module for a drivetrain of a motor vehicle is provided, having a separating clutch for coupling an input-side drive shaft, e.g., a crankshaft of an internal combustion engine for mechanically driving the motor vehicle with an output-side intermediate shaft, e.g., a rotor shaft: an electric machine for electrically driving the motor vehicle; and an actuating device which is co-rotatable with the drive shaft or with the intermediate shaft and which serves for actuating the separating clutch. The actuating device has a pressure chamber which is connectable to a pressure source and which serves for providing a hydraulic actuating pressure for actuating the separating clutch. The hydraulic actuating pressure can be built up by means of a hydraulic medium, and the actuating device has a compensation device for at least partially compensating a change in pressure in the pressure chamber caused by centrifugal forces acting on the hydraulic medium.

Since the actuating system co-rotates with the input-side drive shaft or the output-side intermediate shaft, there is no need to mount the actuating system. Instead, the actuating system can be fastened in a rotationally fixed manner to the drive shaft or to the intermediate shaft. The required installation space and manufacturing costs can thus be reduced. In addition, by securely attaching the actuating system to the drive shaft or to the intermediate shaft, it is possible to transmit high torques, e.g., alternating torques of up to 1600 Nm, without any unnecessary loads. A bearing between the actuating system and the shaft fastened to the actuating system, which is otherwise heavily loaded in this case, is omitted so that the durability and the service life are improved.

An axial side of the pressure chamber of the actuating device can be closed by an axially displaceable partition wall, which depending on the actuating pressure in the pressure chamber, e.g., against the spring force of a return spring, can be axially displaced to actuate the separating clutch. For example, an actuating stop projecting from the partition wall, formed for example on an end face of a tube or finger, can strike directly or indirectly as an actuating element on a radially inner edge of a lever spring, e.g., designed as a disk spring. The lever spring can be pivotably mounted and, by changing the conicity thereof, can act radially outside of the pressure chamber on a pressing plate of the separating clutch. If, through the actuation pressure in the pressure chamber of the actuating device, the partition wall acts on the radially inner edge of the actuating element, e.g., a pivotable lever spring or a substantially purely axially displaceable actuating pad, the actuating element can displace the pressing plate axially to open the separating clutch with a separating clutch designed to be "normally closed" or to close the separating clutch with a separating clutch designed to be "normally open".

However, due to the co-rotating actuating device the hydraulic fluid pumped into the pressure chamber of the actuating device also co-rotates so that centrifugal forces act on the hydraulic fluid to drive the hydraulic fluid radially outward. As a result, the hydraulic fluid presses more strongly on the partition wall, through which the pressure which is set in the pressure chamber increases due to centrifugal force depending on the current speed via the originally provided actuation pressure. In principle, this can at least lead to imprecise actuation of the separating clutch, whereby a slip-free or low-slip transmission of a torque can be made more difficult or even prevented. However, using the compensation device, the centrifugal force-related portion of the pressure in the pressure chamber can be at least partially compensated, so that the actuation of the actuating device is independent of the current speed despite the co-rotating design, or at least the extent of the centrifugal force-related dependence on the current speed is reduced.

The compensation device can act on the axial side of the partition wall facing away from the pressure chamber with a compensation force, the amount of which is also dependent on centrifugal force, so that the forces dependent on centrifugal force that act on the partition wall from the pressure chamber and from the compensation device at least partially, e.g., at least largely, cancel each other out. A speed-dependent pressure change in the pressure chamber caused by the co-rotating actuating device can be compensated for by the compensation device, enabling a precise actuation of a separating clutch in a hybrid module and a prevention of unnecessary loads. For example, this enables an at least low-slip transmission of high alternating torques of up to 1600 Nm even without a torsional vibration damper provided in the hybrid module.

The actuating device is understood to mean the structural unit provided within the hybrid module without supply lines or a connected pressure source. The actuating device is also referred to as the clutch engaging element when the separating clutch is engaged, or as the clutch releasing element when the separating clutch is released. As a pressure chamber, the actuating device can have an annular space which runs coaxially to the fixed shaft and into which the partition wall is guided axially in the manner of a piston. This configuration is also referred to as a CSC ("concentric slave cylinder").

The intermediate shaft can be a rotor shaft carrying a rotor of the electric machine or can be at least indirectly coupled to such a rotor shaft of the electric machine. The intermediate shaft can be coupled to a transmission input shaft of a motor vehicle transmission, for example, via at least one further separating clutch. The drive shaft can be driven by the internal combustion engine, which is, for example, designed as a combustion engine. In an example embodiment, the drive shaft is designed as a crankshaft of the internal combustion engine. A flywheel and/or a torsional vibration damper for damping rotational irregularities caused by the combustion of the engine in the internal combustion engine can optionally also be connected to the drive shaft.

The separating clutch may be designed as a normally engaged clutch. Accordingly, a housing of the actuating device, e.g., an actuator housing of the clutch release, may be arranged on an intermediate shaft connected in a rotationally fixed manner to the output of the separating clutch. The housing may be attached to the intermediate shaft in a rotationally fixed manner. This further simplifies the construction of the hybrid module.

Hydraulic supply channels or at least one hydraulic supply channel of the actuating device can be integrated and/or introduced into the intermediate shaft, so that the structure can be further simplified and the assembly effort can be reduced. In principle, it is possible for the compensation device to have a compensation chamber that can be acted upon by a further hydraulic medium or the same hydraulic medium for providing a hydraulic compensation pressure that can be built up with the aid of the hydraulic medium, and the pressure chamber and the compensation chamber are, for example, separated from one another by an axially displaceable partition wall.

If the actuating device has a hydraulic compensation chamber to compensate for a centrifugal force influence on a hydraulic medium within a pressure chamber of the clutch release device (formed separately from the compensation chamber), the functionality of the actuating device is ensured in any operating state. However, the compensation device may also manage without an additional compensation chamber that is separately supplied with hydraulic medium by means of a further hydraulic medium line. In other words, a hybrid module can be implemented with a specially designed separating clutch, wherein actuation is implemented by a shaft-oriented, co-rotating slave cylinder, e.g., an actuating device designed as a clutch release.

In an example embodiment, the actuating device may have only a single supply line for supplying the actuating device with a hydraulic medium, wherein the supply line communicates with the pressure chamber past the compensation device. The manufacturing effort and the manufacturing costs are kept low. The compensation device can, for example, work autonomously, i.e. without the supply of external aids or energy. The compensation device can be operated non-hydraulically, for example in that a centrifugal force acting on a component of the compensation device is converted into a compensation force acting on the partition wall by means of mechanically active mechanisms.

The compensation device may be designed exclusively to build up a compensation force acting on the pressure chamber, e.g., via an axially displaceable partition wall, by centrifugal forces acting on the compensation device. Since both the disruptive centrifugal force-related pressure change in the pressure chamber and the compensation force compensating for this pressure change are caused exclusively by centrifugal forces, an exact and relatively complete compensation of the portion of the pressure change can be achieved. The compensation force and the pressure change are coupled to one another via the rotational speed and the centrifugal forces acting as a result, so that a change in the disruptive centrifugal force-related pressure change is reflected in a corresponding change in the compensating compensation force.

The compensation device may have a sensing element which is deformable and/or displaceable under the influence of centrifugal force, e.g., which is designed as a spring element, for the buildup of a compensation force acting on the pressure chamber corresponding to the centrifugal forces acting on the sensing element, e.g., via an axially displaceable partition wall. The sensing element can sense the acting centrifugal force, for example, in such a way that the sensing element is deformed and/or displaced by a corresponding proportion as a function of the acting sensing force. This reaction of the sensing element to the acting centrifugal force can, if necessary, be used by the compensation device to build up a compensation force corresponding thereto. For this purpose, various principles of action based on centrifugal force are possible which, via a kinematic mechanical coupling, can build up a compensation force corresponding to the acting centrifugal force, as is shown in the following as an example. In this case, it is basically possible to provide exactly one of the operating principles shown below or to provide different operating principles in combination at the same time.

In an example embodiment, the compensation device has a disk spring, wherein the disk spring has a radially outer force edge on a housing of the actuating device and is supported with a radially inner force edge on a partition wall at least partially delimiting the pressure chamber and is axially displaceable. The inner force edge, which is formed, for example, by spring tongues projecting in the radial direction, is able to be bent radially outward as a function of centrifugal force to build up a compensation force acting in the axial direction on the pressure chamber. For example, the disk spring may have spring tongues which project radially inward from a disk spring ring and which can form spring tongue regions on the radially inner free end which can serve as a radially inner force edge. The spring tongues can, for example, run so as to be inclined to the radial plane. Under the influence of centrifugal force, the radially inner force edge can bend away radially outward, so that the radially inner force edge strives, with the movement component thereof in the axial direction during the bending movement, to displace the partition wall in the axial direction, e.g., to push it away. As a result, a compensation force corresponding to the centrifugal force-related pressure change in the pressure chamber can be built up by simple and inexpensive mechanical means.

The compensation device may have a hose at least partially filled with a fluid and/or gel-like and/or pasty centrifugal mass, wherein the hose is connected to a housing of the actuating device covering the hose radially on the outside thereof and is supported on a partition wall which at least partially delimits the pressure chamber and is axially displaceable. The hose may be deformable through a pressing dependent on centrifugal force of the centrifugal mass on the housing against the partition wall to build up a compensation force dependent on centrifugal force acting in the axial direction on the pressure chamber. The easily deformable centrifugal mass in the hose can be pressed radially outward against the housing due to centrifugal force, whereby the material of the centrifugal mass tries to spread out in the axial direction. As a result, the flexible hose can be deformed in the axial direction as a result of centrifugal force, whereby the compensation force acting on the partition wall is built up.

The compensation device may have an articulated centrifugal mass supported on a housing of the actuating device and on a partition wall which at least partially delimits the pressure chamber and is axially displaceable, wherein the centrifugal mass, e.g., in the manner of a toggle lever, axially displaces the partition wall under the influence of centrifugal force to build up a compensation force dependent on centrifugal force that acts in the axial direction on the pressure chamber. The centrifugal mass can be articulated to two struts, wherein one strut is articulated to the housing and the other strut to the partition wall. Under the influence of centrifugal force, the centrifugal mass can be driven radially outward, as a result of which the centrifugal mass tries to pivot the struts in such a way that the axial extent increases. In this way, based on the principle of the toggle lever, the compensation force acting on the partition wall can be built up due to centrifugal force.

In an example embodiment, the compensation device has a spring element that runs radially, convexly inward, which, for example, is designed as a helical compression spring or leaf spring. The spring element is supported on a housing of the actuating device and on a partition wall that at least partially delimits the pressure chamber and is axially displaceable, and, to build up a compensation force dependent on centrifugal force that acts in the axial direction on the pressure chamber under increasing centrifugal force, reduces the extent of the convexity thereof. The spring element can be pressed between the housing and the partition wall, e.g., with pretension. Due to the radially inward convex shape of the spring element along the axial course thereof, the spring element tends to increase the axial extent thereof under the influence of centrifugal force when the convex central part is driven radially outward, so that, due to centrifugal force, the spring element acts on the partition wall with a greater spring force and builds up a correspondingly high centrifugal force-related compensation force.

The compensation device may have a partition wall on a housing of the actuating device that at least partially delimits the pressure chamber, and is axially displaceable via a centrifugal mass supported on a ramp system inclined to the radial plane. The centrifugal mass axially displaces the partition wall under the influence of centrifugal force to build up a compensation force dependent on centrifugal force that acts in the axial direction on the pressure chamber. The ramp system can form a sliding surface formed by the centrifugal mass and at least indirectly formed by the partition wall, inclined to the radial plane, which can slide and/or roll against one another to change the axial extent of the ramp system.

In addition, a ramp system can also be formed between the centrifugal mass and the housing to intensify the effect of the radial displacement of the centrifugal mass. If the centrifugal mass is driven radially outward under the influence of centrifugal force, the ramp system tends to increase the axial extent thereof so that the ramp system can impress a correspondingly high centrifugal force-related compensation force to the partition wall.

The actuating device may be connected to the drive shaft or to the intermediate shaft in a rotationally fixed manner, wherein the drive shaft or intermediate shaft connected to the actuating device in a rotationally fixed manner has a supply bore for supplying the pressure chamber with the hydraulic fluid. The supply bore can communicate with the pressure chamber e.g., via a connecting bore which is radial or inclined to the radial plane. An annular groove running closed in the circumferential direction may be provided in the shaft attached to the actuating device, via which the pressure chamber can communicate with the supply bore in any relative rotational position. Separate hydraulic lines for actuating the actuating device and the space required therefor can be spared as a result.

BRIEF DESCRIPTION OF THE DRAWINGS

In the following, the disclosure is explained by way of example with reference to the accompanying drawings using exemplary embodiments, in which the features shown below can represent an aspect of the disclosure both individually and in combination. In the figures.

DETAILED DESCRIPTION

Figure 1:
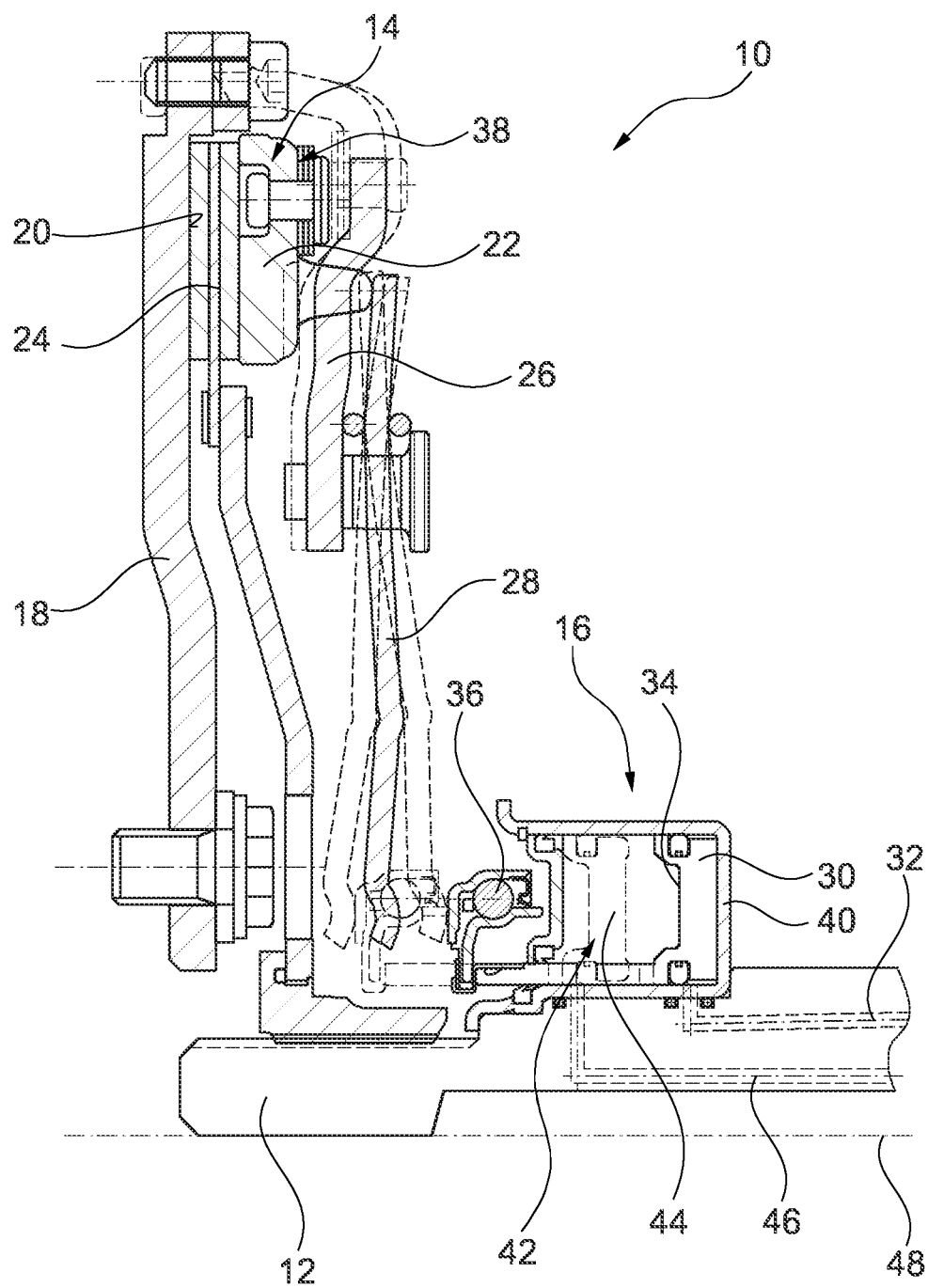
FIG. 1 shows a schematic longitudinal sectional illustration of a hybrid module according to a first exemplary embodiment.

The hybrid module 10 shown in FIG. 1 for a drivetrain of a hybrid motor vehicle can be configured to couple a drive shaft, e.g., configured as a crankshaft, of an internal combustion engine configured as a combustion engine with an intermediate shaft 12. The intermediate shaft 12 can be coupled to a rotor of an electric machine or even form a rotor shaft for the rotor of the electric machine itself. The electric machine can drive the motor vehicle in motorized operation as an electric motor. The intermediate shaft 12 can be coupled to a transmission input shaft of a motor vehicle transmission or form the transmission input shaft. The hybrid module 10 has a separating clutch 14 which can be hydraulically actuated by an actuating system 16.

The separating clutch 14 has a flywheel 18 which is connected to the drive shaft and which at the same time forms a counter-disk 20. Using an axially displaceable pressing plate 22, a clutch disk 24 which is coupled to the intermediate shaft 12 in a rotationally fixed but axially displaceable manner, for example via a spline, can be pressed in a frictionally locking manner. A clutch cover 26 is connected to the flywheel 18 on which a lever spring 28 configured as a disk spring is pivotably mounted as an actuating element for axially displacing the pressing plate 22.

The actuating system 16 designed in the manner of a CSC has an annular coaxial pressure chamber 30 in which an actuation pressure can be built up via a supply line 32 provided in the intermediate shaft 12. The pressure chamber 30 is closed on one axial side with a partition wall 34, which can be axially displaced as a function of the resulting pressure acting on the partition wall 34. The partition wall 34 acts, for example, via an actuating bearing 36 designed as an angular contact ball bearing, on the radially inner edge of the lever spring 28 to cause the lever spring to pivot about a pivot point running in the circumferential direction and to displace the pressing plate 22 by changing the conicity of the lever spring 28. In the exemplary embodiment shown, the separating clutch 14 is designed as a normally-engaged ("normally closed") clutch, in which the pressing plate 22 is closed by a return spring 38 designed as a leaf spring assembly and is opened against the spring force of the return spring 38 when there is an actuation pressure in the pressure chamber 30 of the actuating system 16.

The actuating system 16 has a housing 40 that delimits the pressure chamber 30 and accommodates the partition wall 34, and is firmly connected to the intermediate shaft 12 so that the actuating system 16 is designed to co-rotate with the intermediate shaft 12, and a bearing between the actuating system 16 and the intermediate shaft 12 is not required. To compensate for an increase in pressure in the pressure chamber 30 caused by an increasing speed of the intermediate shaft 12 due to the effects of centrifugal force on the hydraulic medium located in the pressure chamber 30, the co-rotating actuating system has a co-rotating compensation device 42 which, depending on the speed of the intermediate shaft 12, impresses a compensation force on the pressure chamber 30 facing away from the axial side of the partition wall 34 to compensate for the centrifugal force-related pressure increase in the pressure chamber 30, so that the resulting force acting on the partition wall 34 is essentially independent of the speed of the intermediate shaft 12 and the centrifugal forces caused thereby, and only acts on the actuating force originally hydraulically applied via the supply line 32.

In the exemplary embodiment shown in FIG. 1, the compensation device 42 has a compensation chamber 44 formed in the housing 40, which is essentially supplied with hydraulic medium at ambient pressure via a separate hydraulic medium line 46 and presses against the partition wall 34. The force components from the pressure chamber 30 and from the compensation chamber 44, which are caused by centrifugal forces and act on the partition wall 34, can cancel each other out.

The hybrid module 10 is shown only partially schematically with regard to the rotor of the electric machine thereof. The electric machine is designed in a typical manner and can have a stator accommodated in a module housing of the hybrid module 10. The rotor of the electric machine is rotatably mounted radially within the stator. The rotor is either permanently coupled to a transmission input shaft or, can be decoupled from this transmission input shaft via at least one clutch, e.g., a plurality of clutches such as a dual clutch. The rotor can also be permanently connected to the intermediate shaft 12 of the hybrid module 10 in a rotationally fixed manner.

The intermediate shaft 12 is connected in a rotationally fixed manner to an output side of the separating clutch 14 formed by the clutch disk 24. The clutch disk 24 itself typically has a carrier part which receives the friction lining in a rotationally fixed manner on a radial outer side. A hub is connected to the carrier part on a radial inner side, which hub is further connected to the intermediate shaft 12 in a rotationally fixed manner. The actuating device 16 is arranged with regard to the actuating bearing 36 thereof on a side of the separating clutch 14 facing the rotor. This side, referred to as the rotor side, is thus a side of the separating clutch 12 facing away from the internal combustion engine. The actuating device 16 is designed to rotate at the same time on the output side with respect to the separating clutch 14.

The supply line 32 and/or the hydraulic medium line 46 is may be implemented by a plurality of bores. With regard to the supply line 32, it can also be seen that a first bore region running in the axial direction is inclined/runs at an angle with respect to an axis of rotation 48 of the hybrid module 10 to facilitate a venting of the system. Optionally, the hydraulic medium line 46, which in the illustrated exemplary embodiment runs parallel to the axis of rotation 48, can also be inclined in sections with respect to the axis of rotation 48. The compensation chamber 44 is sealed off from the environment by a front plate.

The separating clutch 14 of the first exemplary embodiment is thus designed to be normally closed/engaged. The separating clutch 14 is supported by the flywheel 18 on the drive shaft. The separating clutch 14/clutch cover 26 is screwed onto the flywheel 18. Leaf springs are arranged within the friction surface. The actuation takes place by means of a CSC (concentric clutch release; e.g., with a hydrostatic actuator). The CSC is connected to the intermediate shaft 12 and rotates therewith. The supply takes place via the intermediate shaft 12, e.g., by low pressure in the subsequent multi-stage automation. The CSC may include a pressure chamber 30 and a compensation chamber 44 to compensate for the influence of centrifugal force. A separate front plate may be provided to represent the compensation chamber 44. Optionally, an inclined course of the supply bore made in the intermediate shaft 12 is provided for effective ventilation. The exemplary embodiment can, in principle, also be implemented for a separating clutch 12 designed as a multi-disk clutch.

Figure 2:
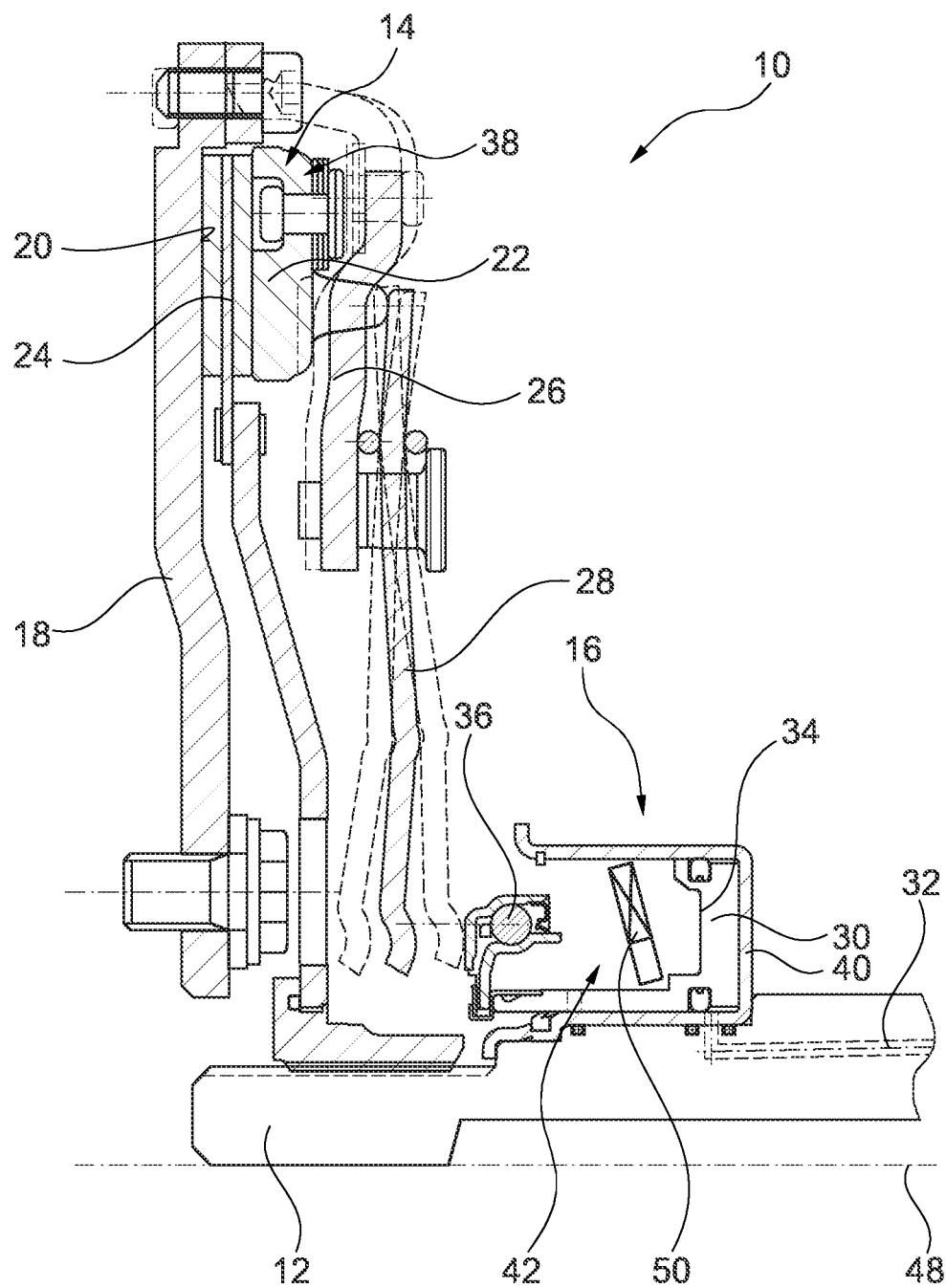
FIG. 2 shows a schematic longitudinal sectional illustration of a hybrid module according to a second exemplary embodiment.
Figure 3:
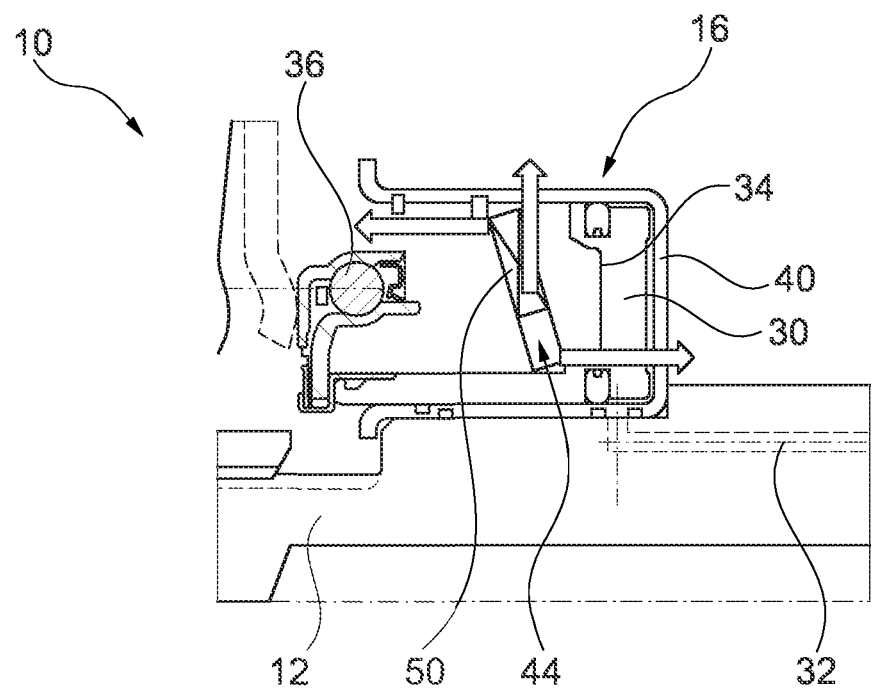
FIG. 3 shows a schematic detail view of an actuating device of the hybrid module of FIG. 2.

In the exemplary embodiment of the hybrid module 10 shown in FIG. 2, in comparison to the exemplary embodiment of the hybrid module 10 shown in FIG. 1, instead of the compensation chamber 44, a spring element 50 is provided in the compensation device 42 which, as a conical, centrifugal-force-influenced counter-spring, can impress a compensation force on the partition wall 34. The spring element 50 may be designed as a disk spring, the force edge of which lies radially on the outside and the tongues of which lie radially on the inside, whereby the centrifugal force acts on the tongues in the case of the conical disk spring, so that by tilting the disk spring under the influence of centrifugal force, the force edge can compensate for the centrifugal force on the hydraulic medium. The spring element 50, which is inclined to the radial plane, is axially supported radially on the outside on the housing 40, so that the spring tongues of the spring element 50 can bend away radially outward under the influence of centrifugal force and with a movement component in the axial direction, as shown in detail in FIG. 3.

Figure 5:
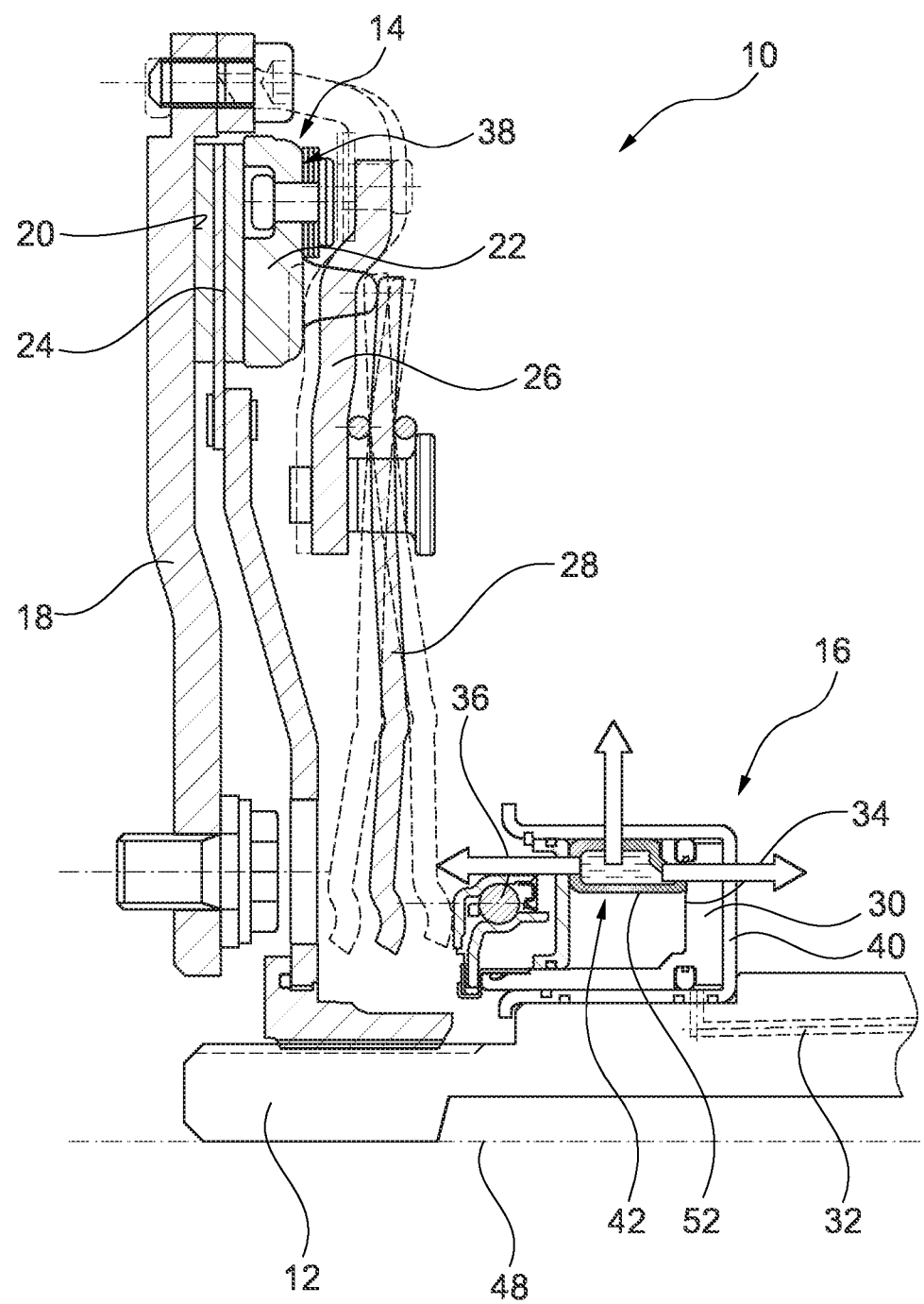
FIG. 5 shows a schematic longitudinal sectional illustration of a hybrid module according to a fourth exemplary embodiment.

In the exemplary embodiment of the hybrid module 10 shown in FIG. 5, in comparison to the exemplary embodiment of the hybrid module 10 shown in FIG. 2, instead of the spring element 50, a co-rotating hose 52 filled with a deformable fluid is provided in the compensation device 42. Under the influence of centrifugal force, the fluid can be displaced radially outward, as a result of which the ring-shaped and closed hose 52 supported axially on the housing 40 can be deformed towards the partition wall 34 and a compensation force can be impressed to compensate for centrifugal forces.

Figure 4:
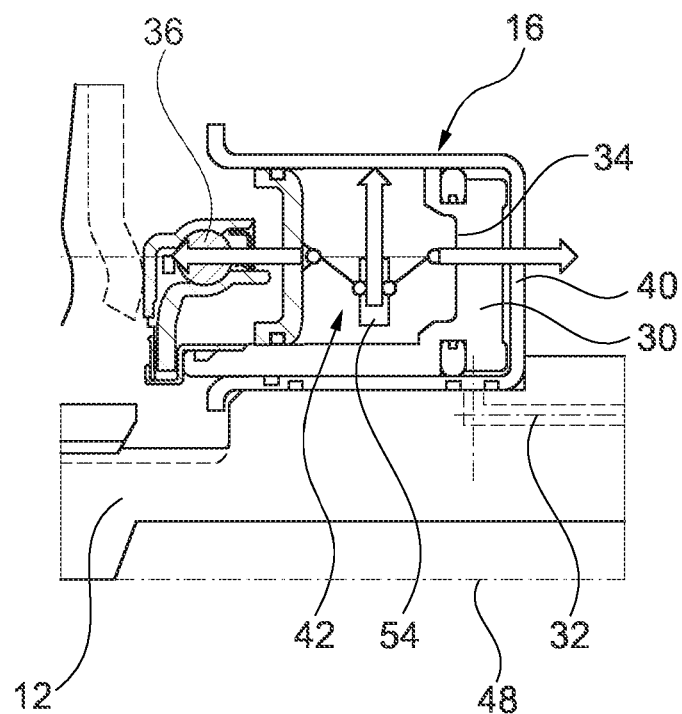
FIG. 4 shows a schematic longitudinal sectional illustration of a hybrid module according to a third exemplary embodiment.
Figure 6:
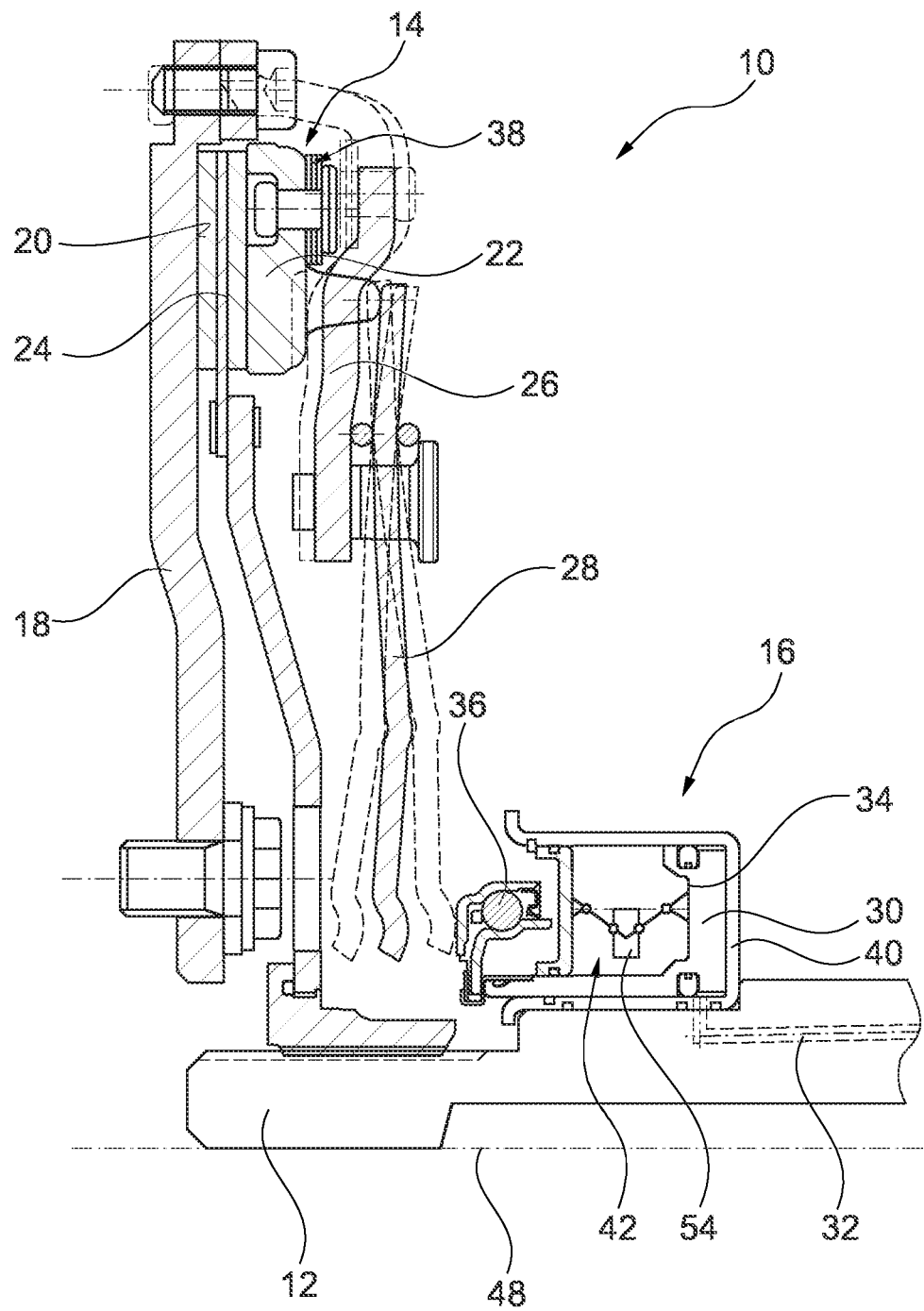
FIG. 6 shows a schematic detail view of an actuating device of the hybrid module of FIG. 5.

In the exemplary embodiment of the hybrid module 10 shown in FIG. 6, in comparison to the exemplary embodiment of the hybrid module 10 shown in FIG. 5, instead of the hose 52, a centrifugal mass 54 is provided in the compensation device 42 in the form of a knee lever articulated on the housing 40 and supported on the partition wall 34. Under the influence of centrifugal force, the at least one centrifugal mass 54, e.g., a plurality of centrifugal masses 54 arranged one behind the other, for example, evenly distributed, provided in the circumferential direction can be driven radially outward, whereby struts articulated to the centrifugal mass 54 are pivoted in such a way that the axial portion of the extent thereof is increased and a compensation force is impressed on the partition wall 34, as shown in detail in FIG. 4.

Figure 7:
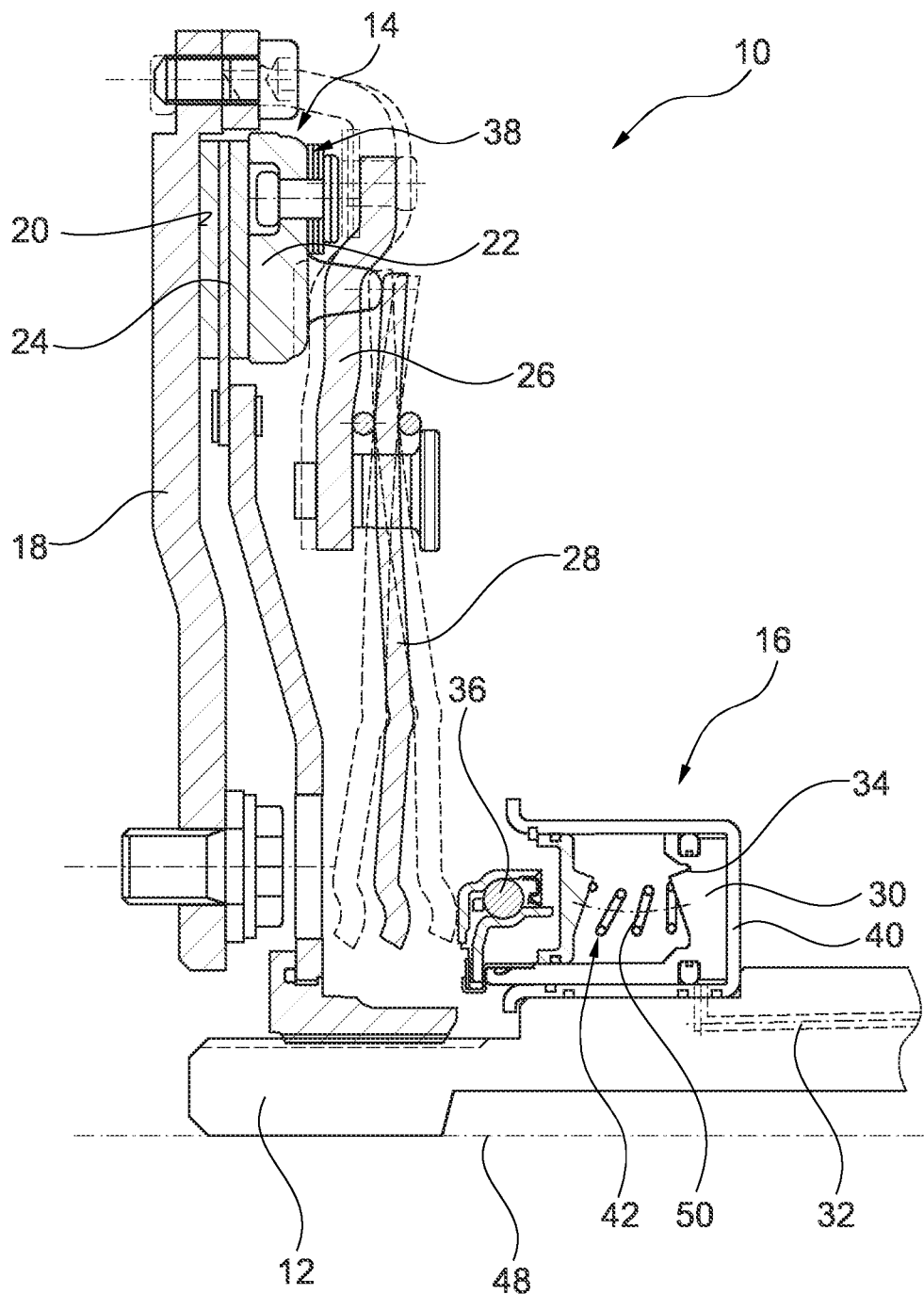
FIG. 7 shows a schematic longitudinal sectional illustration of a hybrid module according to a fifth exemplary embodiment.
Figure 8:
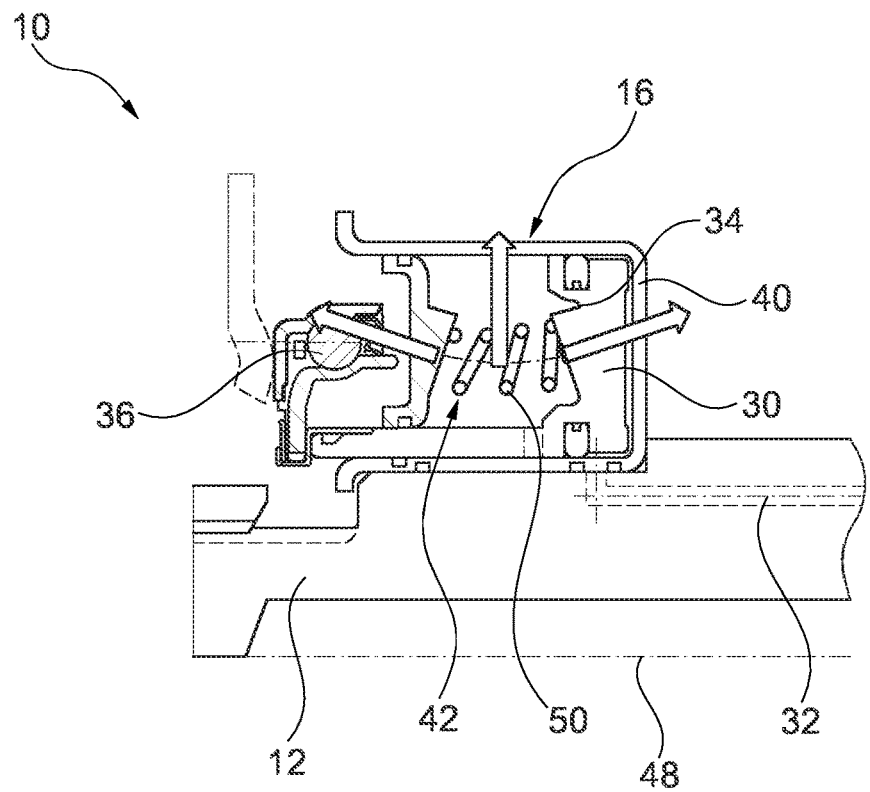
FIG. 8 shows a schematic detail view of an actuating device of the hybrid module of FIG. 7.

In the exemplary embodiment of the hybrid module 10 shown in FIG. 7, in comparison to the exemplary embodiment of the hybrid module 10 shown in FIG. 6, instead of the articulated centrifugal mass 54, a co-rotating spring element 50 designed as a helical compression spring is provided in the compensation device 42, which runs convexly radially inward. Under the influence of centrifugal force, the convex part of the spring element 50 can be driven radially outward, as a result of which the axial extent of the spring element 50 is increased and a compensation force is impressed on the partition wall, as shown in detail in FIG. 8.

Figure 10:
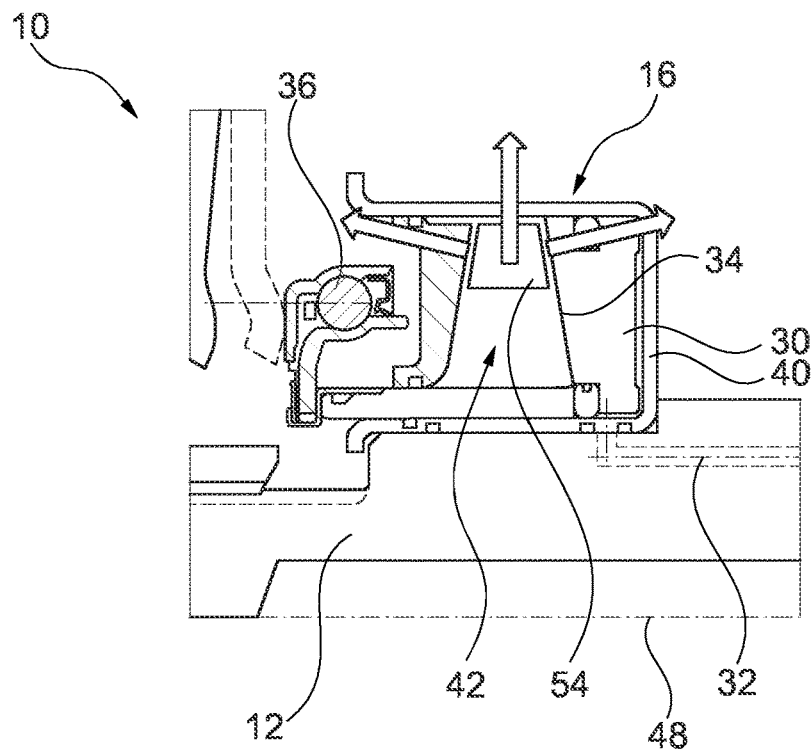
FIG. 10 shows a schematic detail view of an actuating device of the hybrid module of FIG. 9.
Figure 9:
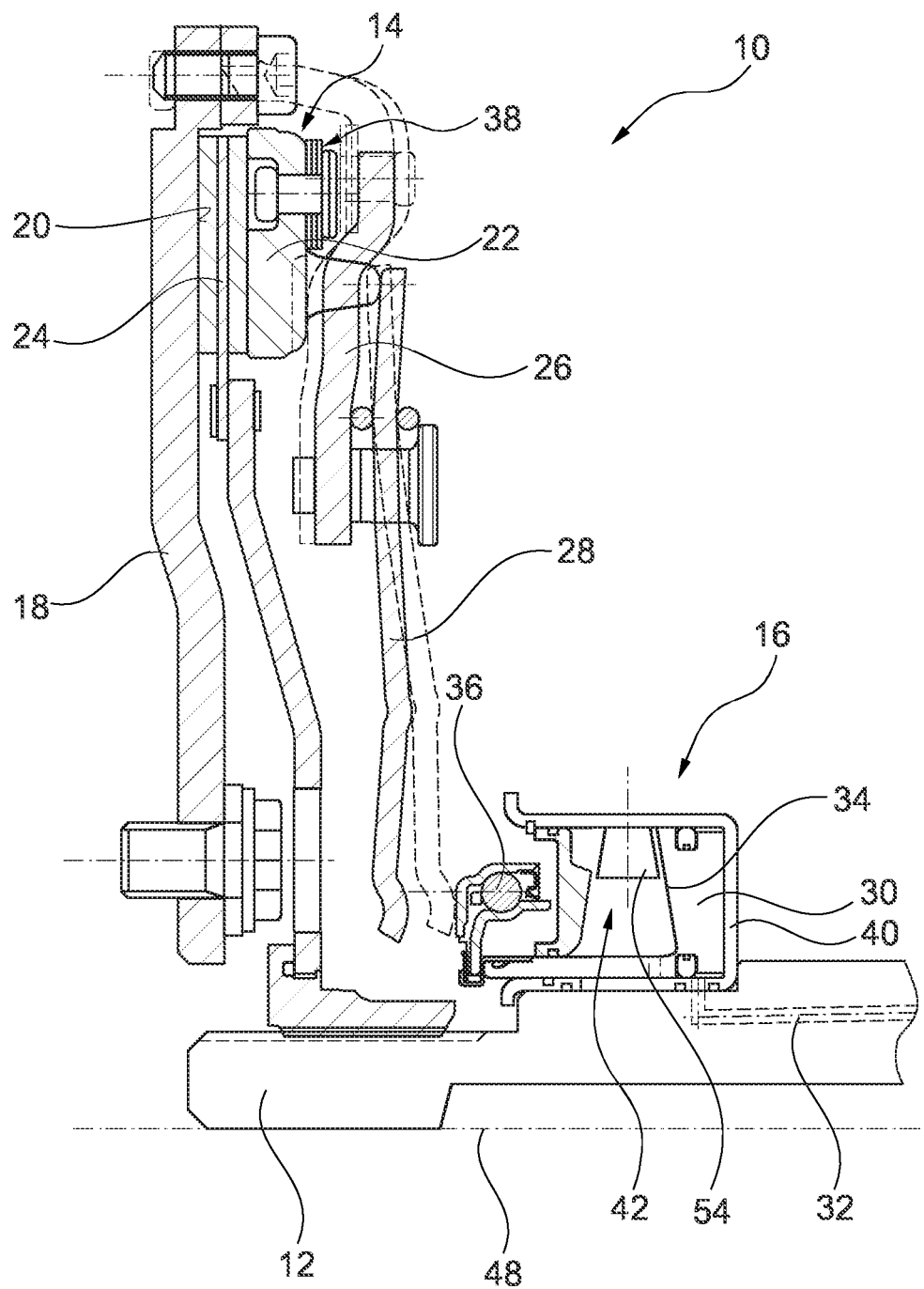
FIG. 9 shows a schematic longitudinal sectional illustration of a hybrid module according to a sixth exemplary embodiment.

In the exemplary embodiment of the hybrid module 10 shown in FIG. 9, in comparison to the exemplary embodiment of the hybrid module 10 with the compensation device 42 shown in FIG. 7, instead of the spring element 50, a centrifugal mass 54 is provided, in particular on the axial sides thereof to the radial plane, which at least forms a ramp system with the partition wall 34. Under the influence of centrifugal force, the at least one centrifugal mass 54, for example designed as a contact cone or to be spherical, can be driven radially outwards, whereby a compensation force aligned with a proportion in the axial direction can act on the partition wall 34 via the ramp system, as shown in detail in FIG. 10.

Figure 11:
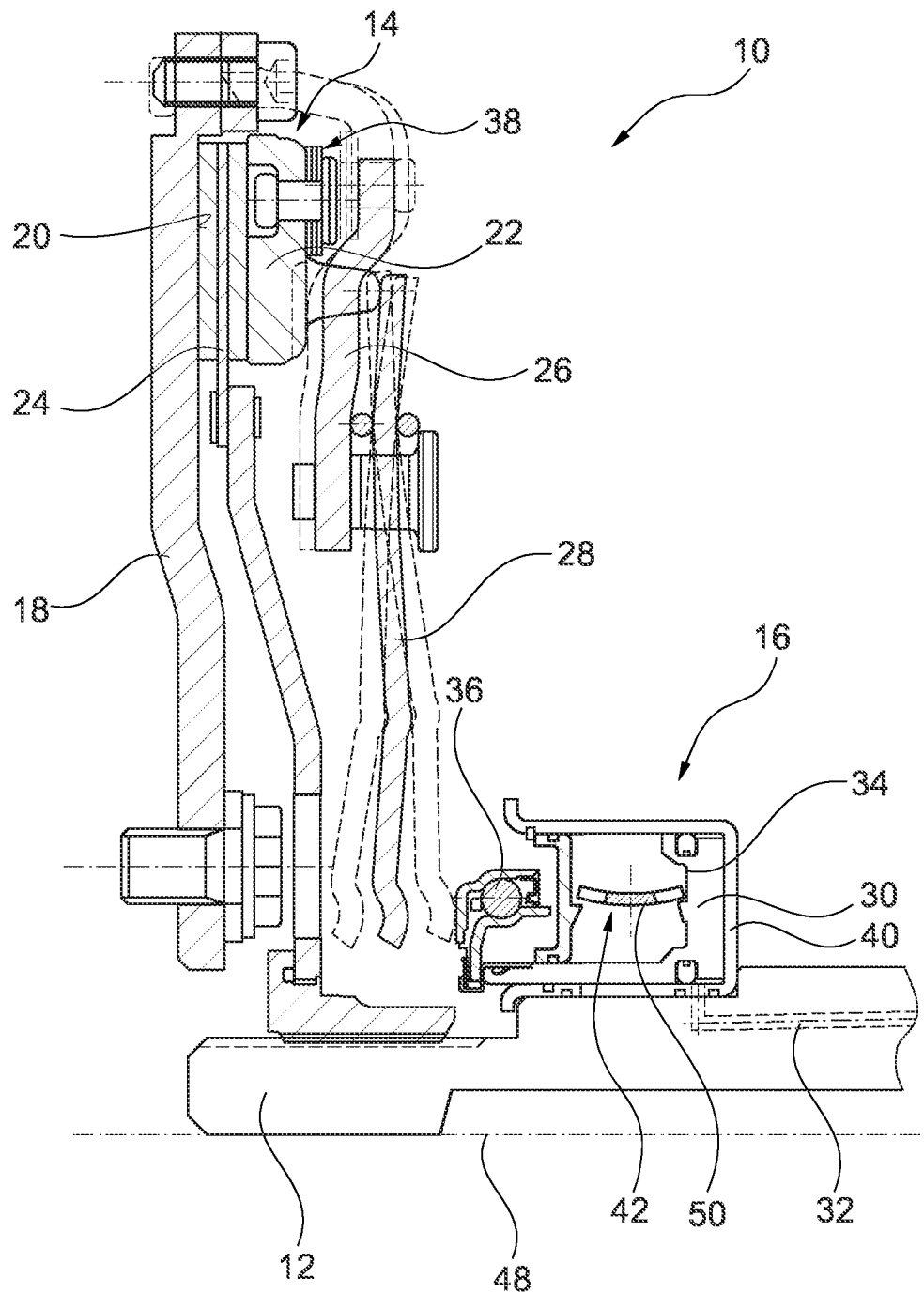
FIG. 11 shows a schematic longitudinal sectional illustration of a hybrid module according to a seventh exemplary embodiment.
Figure 12:
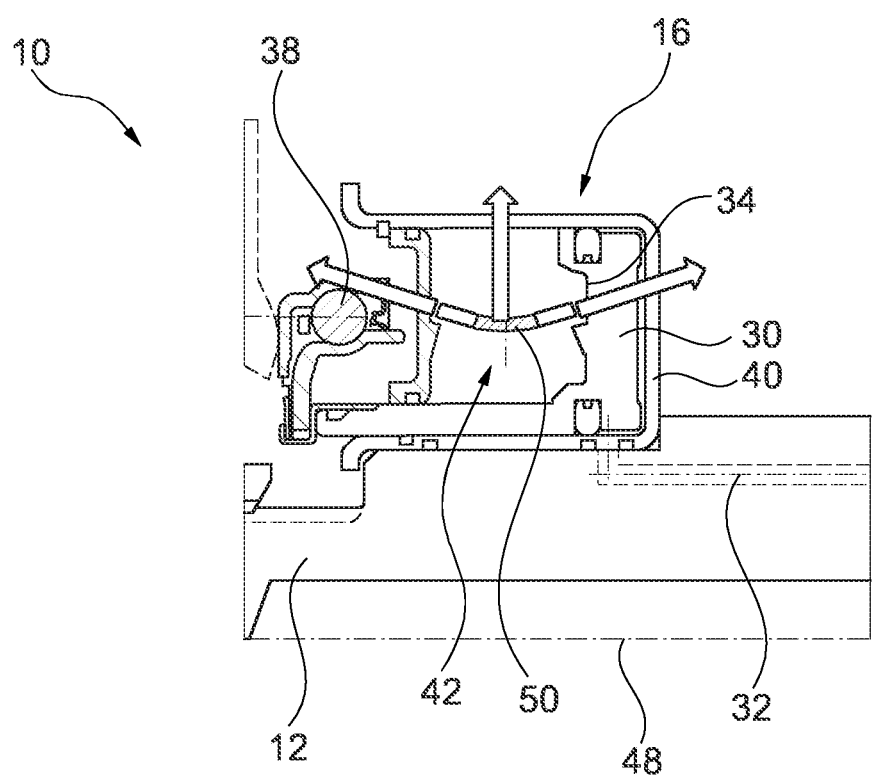
FIG. 12 shows a schematic detail view of an actuating device of the hybrid module of FIG. 11.

In the exemplary embodiment of the hybrid module 10 shown in FIG. 11, in comparison to the exemplary embodiment of the hybrid module 10 shown in FIG. 9, instead of the centrifugal mass 54, a radially inward co-rotating convex spring element 50 in the form of a leaf spring is provided in the compensation device 42. A plurality of individual spring elements 50 or a single spring element 50 can be provided, which has, for example, a spring ring closed in the circumferential direction and spring tongues projecting with a portion from the spring ring in the axial direction and radially outward. Under the influence of centrifugal force, the convex part of the spring element 50 can be driven radially outward, as a result of which the axial extent of the spring element 50 is increased and a compensation force is impressed on the partition wall, as shown in detail in FIG. 12.

REFERENCE NUMERALS

10 Hybrid module
12 Intermediate shaft
14 Separating clutch
16 Actuating system
18 Flywheel
20 Counter-disk
22 Pressing plate
24 Clutch disk
26 Clutch cover
28 Lever spring
30 Pressure chamber
32 Supply line
34 Partition wall
36 Actuating bearing
38 Return spring
40 Housing
42 Compensation device
44 Compensation chamber
46 Hydraulic medium line
48 Axis of rotation
50 Spring element
52 Hose
54 Centrifugal mass

The invention claimed is:

1. A hybrid module for a drivetrain of a motor vehicle, comprising:
    a separating clutch for coupling an input-side drive shaft with an output-side intermediate shaft;
    an actuating device for actuating the separating clutch, co-rotatable with the intermediate shaft, and comprising:
        an actuation bearing;
        a pressure chamber connectable to a pressure source arranged to provide a hydraulic actuating pressure through a hydraulic medium, the pressure chamber comprising an axially displaceable partition wall that acts via the actuation bearing; and
        a compensation device for at least partially compensating a change in pressure in the pressure chamber from a centrifugal force acting on the hydraulic medium.

2. The hybrid module of claim 1 wherein:
    the actuating device comprises a single supply line for supplying the hydraulic medium; and
    the supply line communicates with the pressure chamber past the compensation device.

3. The hybrid module of claim 1 wherein the compensation device is designed to build up a compensation force acting on the pressure chamber from the centrifugal force acting on the compensation device.

4. The hybrid module of claim 3 wherein:
    the compensation force acts on the axially displaceable partition wall.

5. The hybrid module of claim 1 wherein:
    the compensation device comprises a sensing element;
    the sensing element is deformable or displaceable due to the centrifugal force to provide a compensation force corresponding to the centrifugal force; and
    the axially displaceable partition wall is arranged to receive the compensation force.

6. The hybrid module of claim 5 wherein the sensing element is a spring element.

7. The hybrid module of claim 1, wherein:
the actuation device comprises a housing;
the pressure chamber is partially delimited by the axially displaceable partition wall;
the compensation device comprises an axially displaceable disk spring;
the disk spring comprises:
 a radially outer force edge contacting the housing; and
 a radially inner force edge, formed by radially projecting spring tongues, contacting the partition wall; and
the disk spring is deformable in a radially outward direction as a function of a second centrifugal force to apply an axially directed compensation force to the pressure chamber.

8. The hybrid module of claim 1, wherein:
the actuation device comprises a housing;
the pressure chamber is partially delimited by the axially displaceable partition wall;
the compensation device comprises a hose;
the hose is at least partially filled with a fluid, a gel, or a pasty centrifugal mass;
the hose is connected to the housing;
the housing covers a radial outside of the hose;
the hose is supported on the partition wall; and
the hose is deformable as a function of a second centrifugal force that presses the centrifugal mass on the housing and against the partition wall to apply an axially directed compensation force to the pressure chamber.

9. The hybrid module of claim 1, wherein:
the actuation device comprises a housing;
the pressure chamber is partially delimited by the axially displaceable partition wall;
the compensation device comprises an articulated centrifugal mass supported on the housing and the partition wall; and
the articulated centrifugal mass is arranged to axially displace the partition wall due to a second centrifugal force to apply an axially directed compensation force to the pressure chamber.

10. The hybrid module of claim 9 wherein the articulated centrifugal mass acts as a toggle lever.

11. The hybrid module of claim 1, wherein:
the actuation device comprises a housing;
the pressure chamber is partially delimited by the axially displaceable partition wall;
the compensation device comprises a spring element that runs radially, convexly inward; and
the spring element is arranged to deform due to a second centrifugal force that reduces an extent of its convexity to apply an axially directed compensation force to the pressure chamber.

12. The hybrid module of claim 11 wherein the spring element is a helical compression spring or a leaf spring.

13. The hybrid module of claim 1, wherein:
the actuation device comprises a housing;
the pressure chamber is partially delimited by the axially displaceable partition wall;
the compensation device comprises a centrifugal mass and a ramp system inclined with respect to a radial plane;
the centrifugal mass is supported on the housing by the ramp system and on the partition wall; and
the centrifugal mass is arranged to axially displace the partition wall due to a second centrifugal force to apply an axially directed compensation force to the pressure chamber.

14. The hybrid module of claim 1, wherein:
the actuating device is connected to the intermediate shaft in a rotationally fixed manner; and
the intermediate shaft comprises a supply bore for supplying the hydraulic medium to the pressure chamber.

* * * * *